US008904707B2

(12) United States Patent
Luurtsema et al.

(10) Patent No.: US 8,904,707 B2
(45) Date of Patent: Dec. 9, 2014

(54) UPSIDE DOWN HANGING PLANTER

(71) Applicants: Dean Luurtsema, Jenison, MI (US); David J Luurtsema, Grandville, MI (US); Robert S Arnold, Hudsonville, MI (US)

(72) Inventors: Dean Luurtsema, Jenison, MI (US); David J Luurtsema, Grandville, MI (US); Robert S Arnold, Hudsonville, MI (US)

(73) Assignee: Innovative Garden Solutions, LLC, Jenison, MI (US)

( * ) Notice: Subject to any disclaimer, the term of this patent is extended or adjusted under 35 U.S.C. 154(b) by 259 days.

(21) Appl. No.: 13/706,683

(22) Filed: Dec. 6, 2012

(65) Prior Publication Data

US 2013/0145689 A1    Jun. 13, 2013

Related U.S. Application Data

(60) Provisional application No. 61/568,984, filed on Dec. 9, 2011.

(51) Int. Cl.
*A01G 9/02* (2006.01)
*A47G 7/02* (2006.01)
*A47G 7/04* (2006.01)

(52) U.S. Cl.
CPC .............. *A01G 9/024* (2013.01); *A47G 7/047* (2013.01)
USPC ............................................ 47/67

(58) Field of Classification Search
CPC ........... A01G 9/02; A01G 9/024; A47G 7/04; A47G 7/02; A47G 7/047
USPC .............................. 47/65.6, 66.2, 67, 83, 31.1
See application file for complete search history.

(56) References Cited

U.S. PATENT DOCUMENTS

| 4,349,172 | A | * | 9/1982 | Banks, Jr. | 248/318 |
| 4,592,166 | A | * | 6/1986 | Tendrup et al. | 47/67 |
| 5,184,421 | A | * | 2/1993 | Meharg | 47/65.5 |
| 6,094,861 | A | * | 8/2000 | Sandman et al. | 47/67 |
| 6,298,600 | B1 | * | 10/2001 | Feldman | 47/67 |
| 6,345,466 | B1 | | 2/2002 | Venanzi | |
| 6,874,278 | B2 | | 4/2005 | Felknor et al. | |
| 7,845,112 | B2 | * | 12/2010 | Felknor | 47/65.8 |
| 8,468,742 | B2 | * | 6/2013 | Morris | 47/67 |
| 2004/0123522 | A1 | | 7/2004 | Felknor et al. | |
| 2009/0158653 | A1 | | 6/2009 | Oliver et al. | |
| 2010/0205861 | A1 | | 8/2010 | Morris | |
| 2011/0126454 | A1 | | 6/2011 | Sperzel | |

* cited by examiner

*Primary Examiner* — Monica Williams
(74) *Attorney, Agent, or Firm* — Miller, Canfield, Paddock and Stone; John H. Engelmann

(57) ABSTRACT

The present invention provides a hanging planter for growing plants upside down. Because the planter has a flat bottom, plants may be grown in the planter right side up. At a convenient time the planter may be turned to hang upside down.

14 Claims, 8 Drawing Sheets

UPSIDE DOWN HANGING PLANTER

CROSS REFERENCE TO RELATED APPLICATIONS

This application asserts priority from provisional application 61/568,984, filed on Dec. 9, 2011 which is incorporated herein by reference.

FIELD OF THE INVENTION

This invention relates to an upside down hanging planter which is rigid and thus can be used as a conventional planter or an upside down planter. At a nursery, the planted as if the planter were a conventional right side up planter. When the user wishes to do so, the planter may be turned upside down.

BACKGROUND OF THE INVENTION

Upside down hanging planters are well known. Such planters may be used to grow plants such as tomatoes above ground to keep them away from pests such as rabbits.

US Patent Application 2011/0126454 filed by Werner Sperzel discloses a planter container made of flexible material in a bag-like shape used to fill, ship and cultivate a plant from seedling to mature plant. The planter can be used both with the plant upright for initial growth and stability during cultivation and shipment and then inverted to an upside down position to hang plants in the home garden.

US Patent Application 2009/0158653 filed by Frank F. Oliver et al. relates to a hanging planter having an interior chamber with a liner made of a material of the type suitable for retaining growing medium therein. The structure and liner include at least one opening that permits the plant to be positioned within the growing medium such that the root structure grows within the interior chamber and the stem portion grows downward without the need for external structure. Optionally, a self-watering system is included.

US Patent Application 2010/0205861 filed by John Patrick Morris relates to a hanging planter having a body suitable for receiving plant growth medium and the root structure of a plant. The planter has a lower opening through which the plant can grow, and a water reservoir such that that the water can gradually move from the reservoir into the planter's body to water a plant.

US Patent Application 2004/0123522 and U.S. Pat. No. 6,874,278 issued to Wilson A. Felknor, et al. relate to a hanging planter a chamber with a bottom hole. A retainer member provides support for a plant growing downward through the bottom hole.

U.S. Pat. No. 6,874,278 issued to Felknor, et al. relates to a hanging planter a chamber with a bottom hole. A retainer member provides support for a plant growing downward through the bottom hole.

U.S. Pat. No. 6,345,466, issued to Venanzi relates to a portable gardening system having a grow box with a plurality of holes in the bottom, which can be utilized as needed, for growing multiple types of vegetation upside down out of the bottom of the grow box. Plants may also be grown upwards from the grow box.

SUMMARY OF THE INVENTION

The present invention provides a planter in which a plant may be grown either upwards or upside down. Growing a plant upside down can be particularly advantageous for plants which require a lot of space such as tomatoes. However, the planter is not limited to tomatoes. Other plants such as strawberries, herbs, and flowering plants could be grown in the planter. When grown in the ground tomato plants typically spread out and require some sort of support such as a cage to keep it from sprawling. There is no need for such support if the same plant is grown upside down, that is, with the roots above what would normally be the upper part of the plant. Growing the plant upside down increases the yield in a given area. The planter has four parts: a pot, two end caps and a separate hanging assembly.

BRIEF DESCRIPTION OF THE DRAWINGS

FIG. 5 shows a view of the end cap which the plant does not grow through.

DETAILED DESCRIPTION OF THE INVENTION

Figure 1:
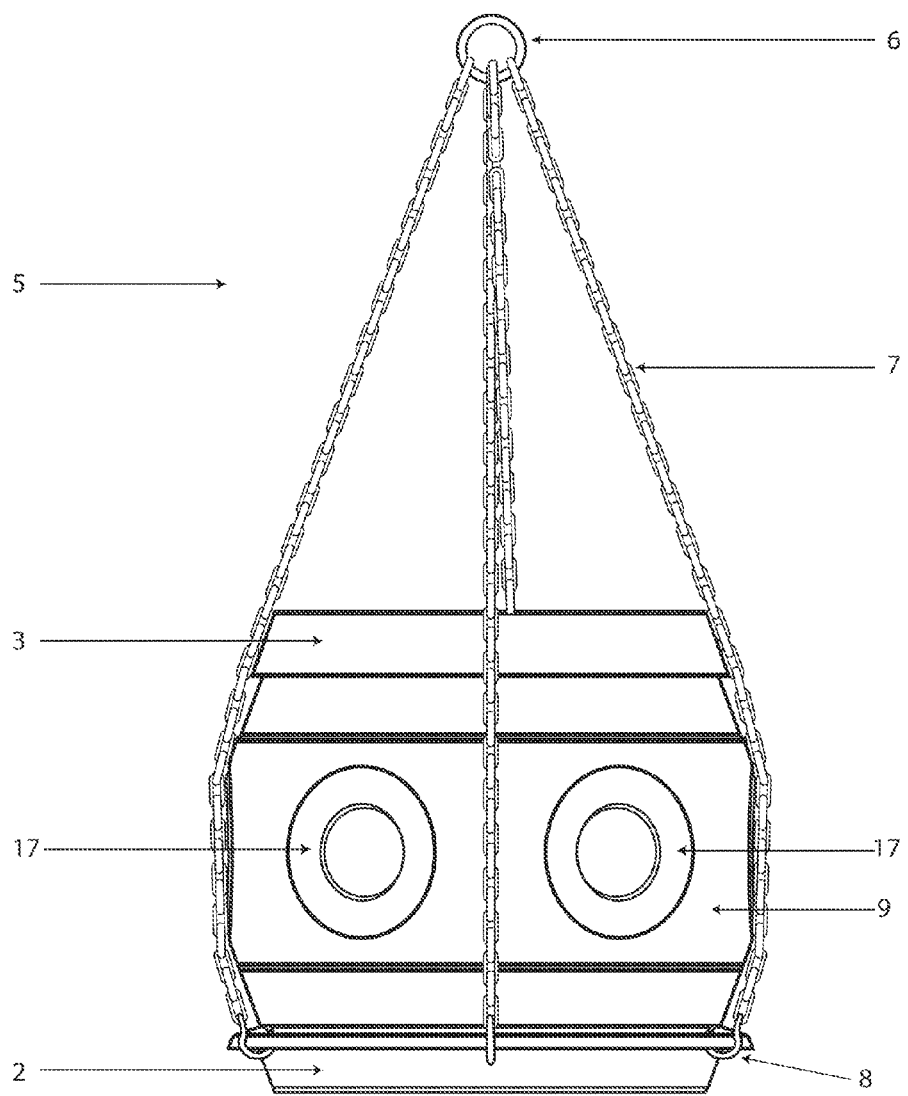
FIG. 1 shows show the complete planter (1) with the attached hanging assembly

FIG. 1 shows the assembled hanging planter (1) with the end caps (2) and (3) attached. The hanging assembly (5) has a central ring (6) from which four stingers (7) are attached. At the end of each stringer there is a hook (8) which attach to the end cap (2) through which the plant grows. It has optional portals (17) around the side of pot (9).

Figure 2:
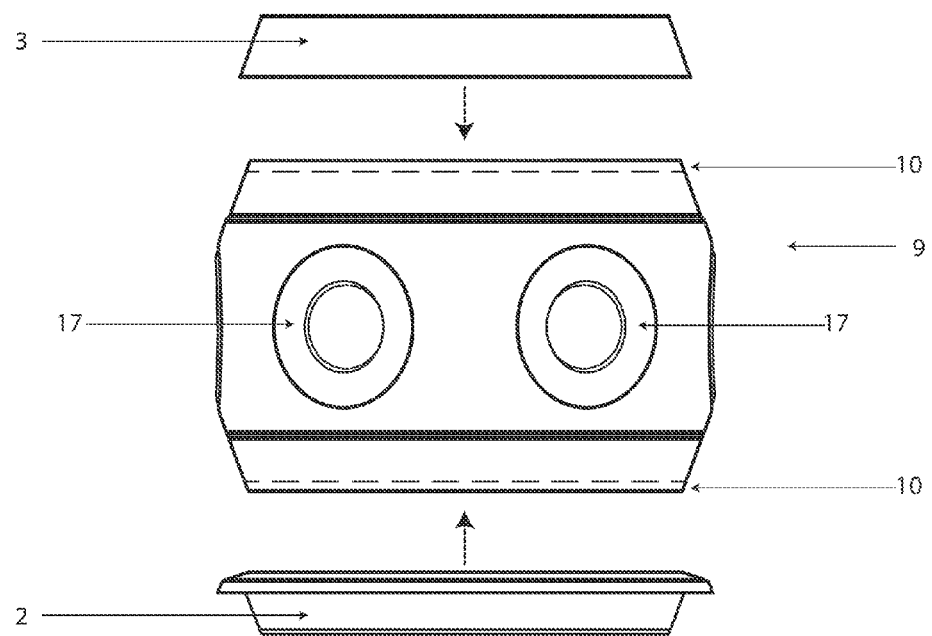
FIG. 2 shows a side view of the pot portion of the planter

FIG. 2 shows a side view of the pot portion (9) of the planter. Each end of the planter has a lip (10) to which the end cap (2) and end cap (3) can attach. The pot portion (9) of the planter is open at both ends. It has optional portals (17) around the side of pot (9).

Figure 3:
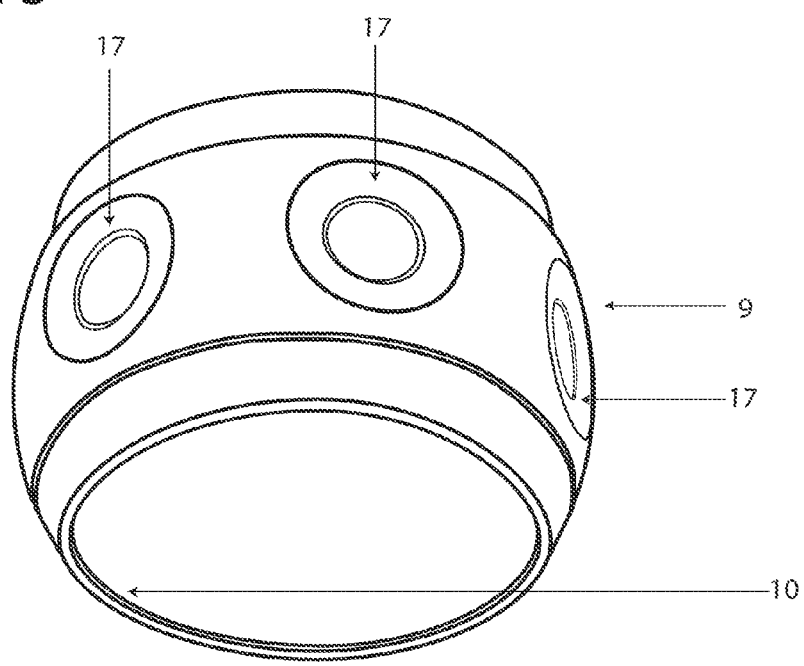
FIG. 3 shows a and end view of the pot portion of the planter

FIG. 3 shows and end view of the pot portion (9) of the planter. A lip (10) is on each end pot portion (9) of the planter. It has portals (17) around the side of pot (9).

Figure 4:
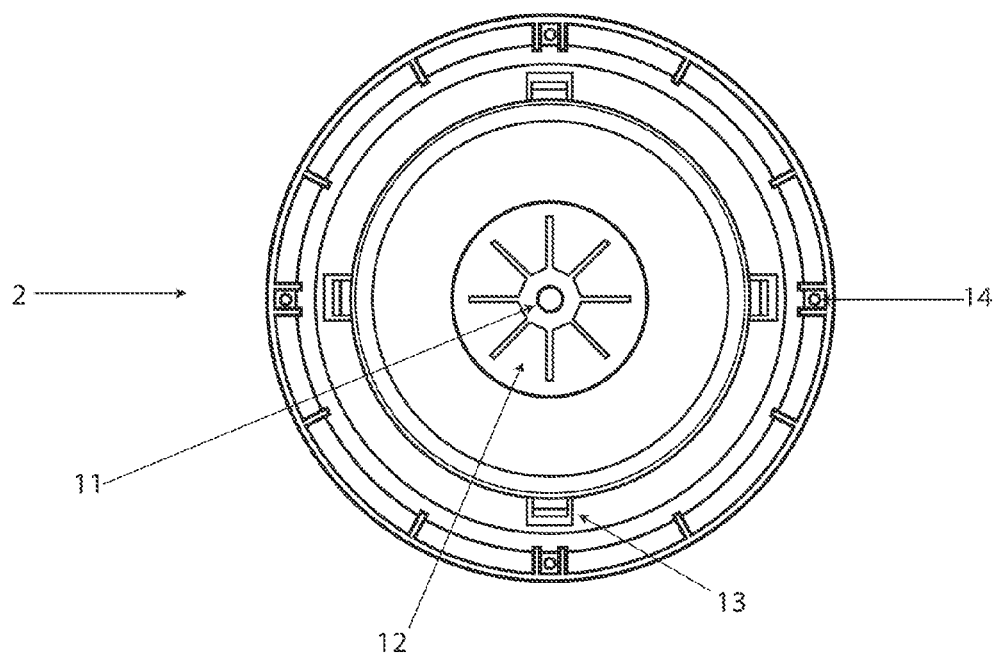
FIG. 4 shows a view of the end cap through which the plant grows

FIG. 4 shows the end cap (2) through which the plant grows. It has a center opening (11) surrounded by tabs (12). The cap has clips (13) which allow the end cap to attach to the pot portion (9) of the planter. There are holes (14) around the circumference of the cap to which the stringer (7) of the hanging assembly (5) can be attached.

Figure 5:
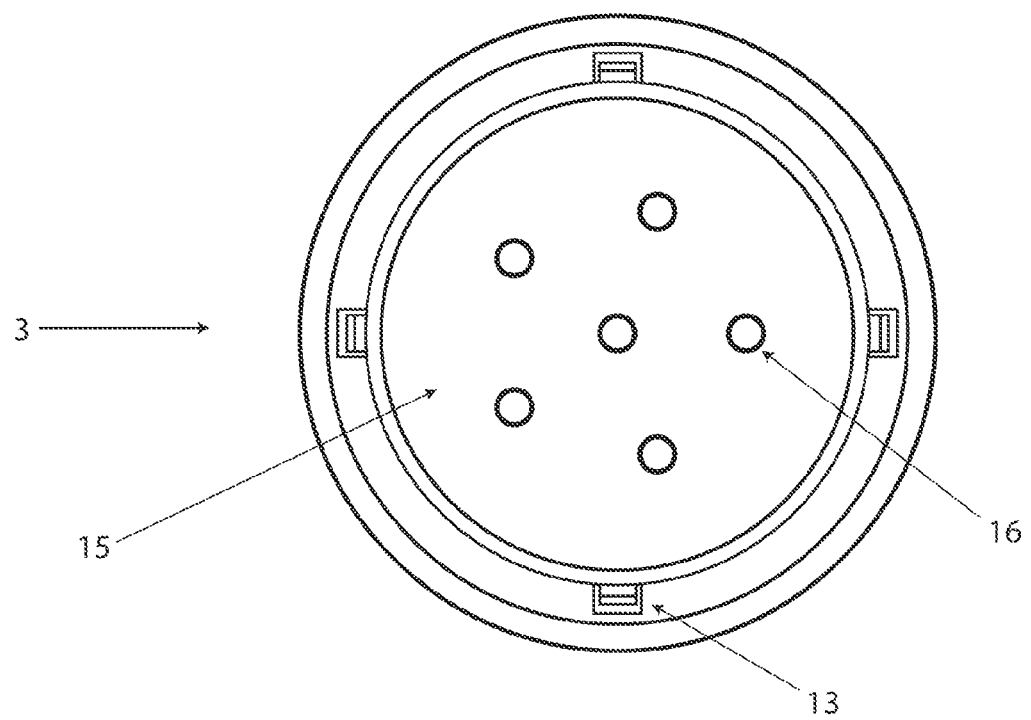

FIG. 5 shows the end cap (3), which the plant does not grow through. The end cap has a recess, that is, a depressed center area (15) with holes (16) through which the plant may be watered. The end cap has clips (13).

Figure 6:
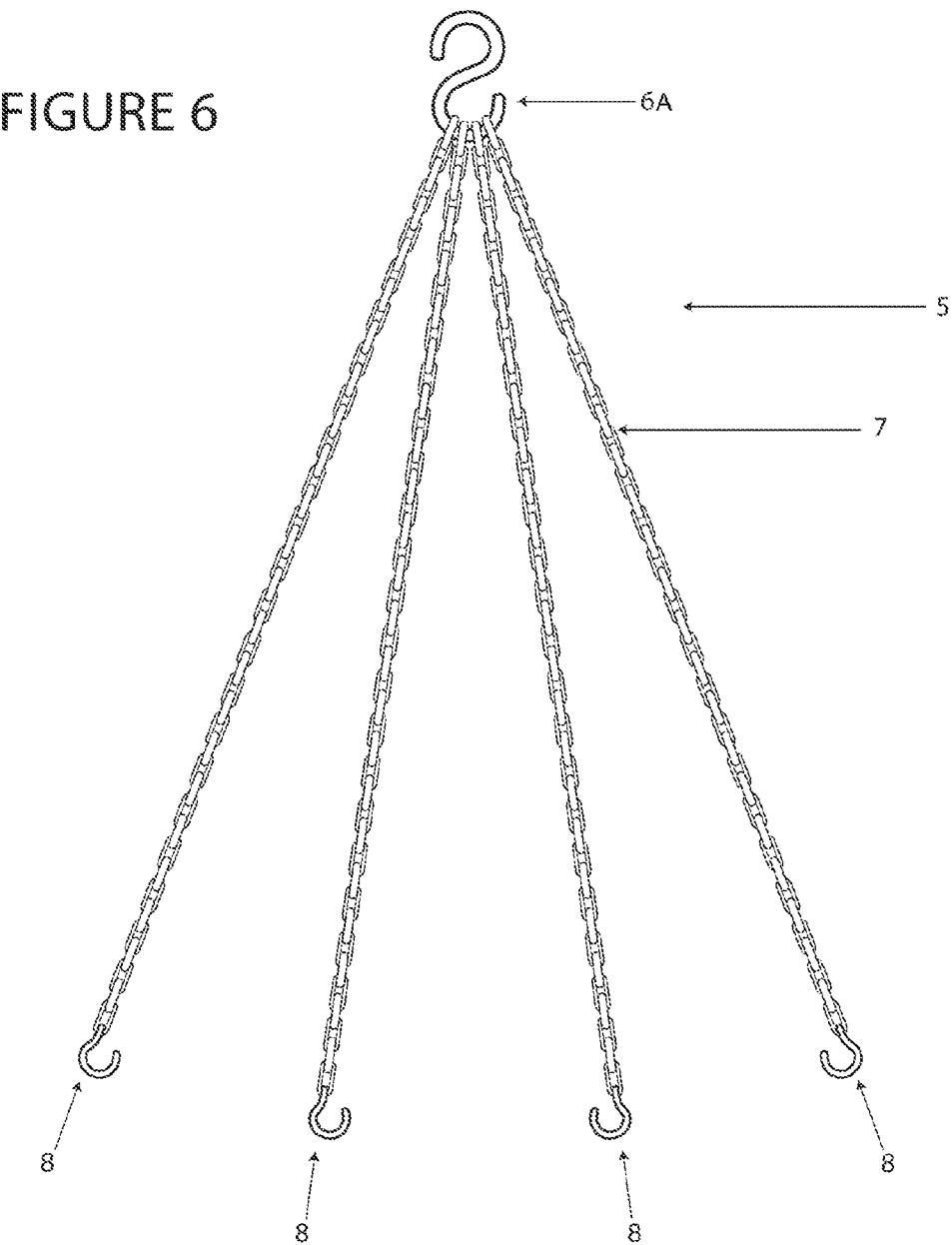
FIG. 6 shows the hanging assembly.

FIG. 6 shows the hanging assembly (5). There are four stringers (7) which end in hooks (8). The stringers attach to a hook (6A).

Figure 7:
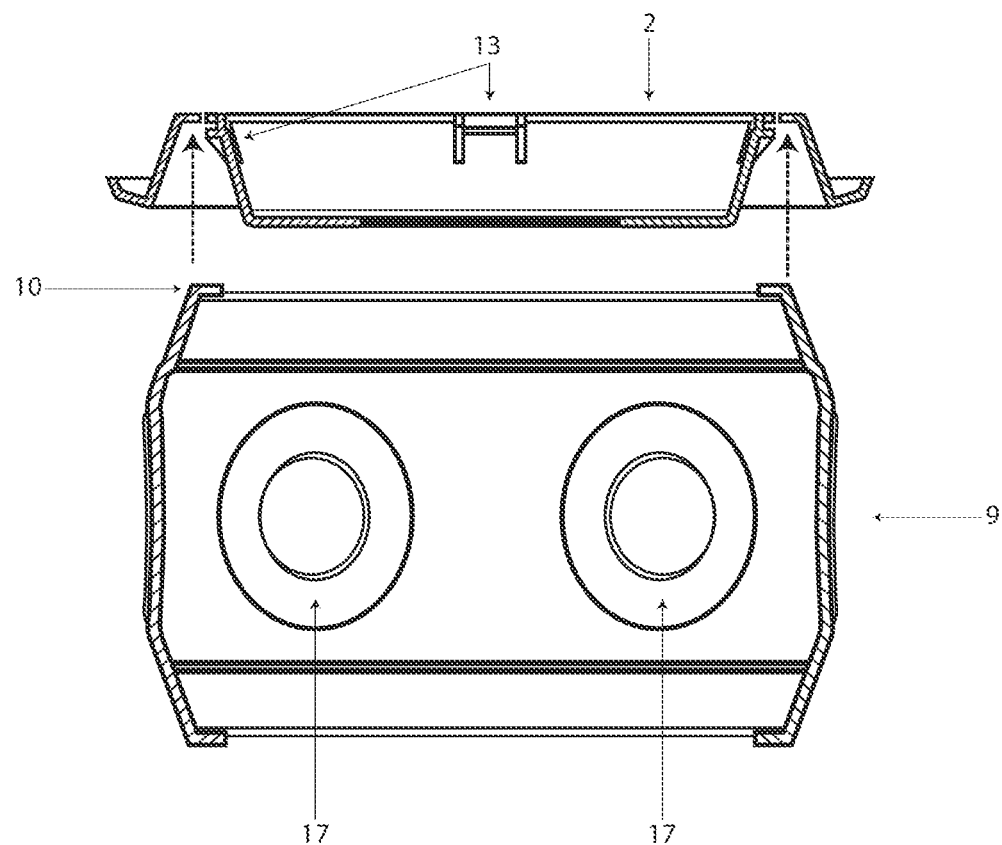
FIG. 7 shows a cutaway view of the locking mechanism used to connect the end cap through which the plant grows.

FIG. 7 shows a cut off view of end cap (2) through which the plant grows. The cap has clips (13) which allow the end cap to attach to the pot portion (9) of the planter. It has portals (17) around the side of pot (9).

Figure 8:
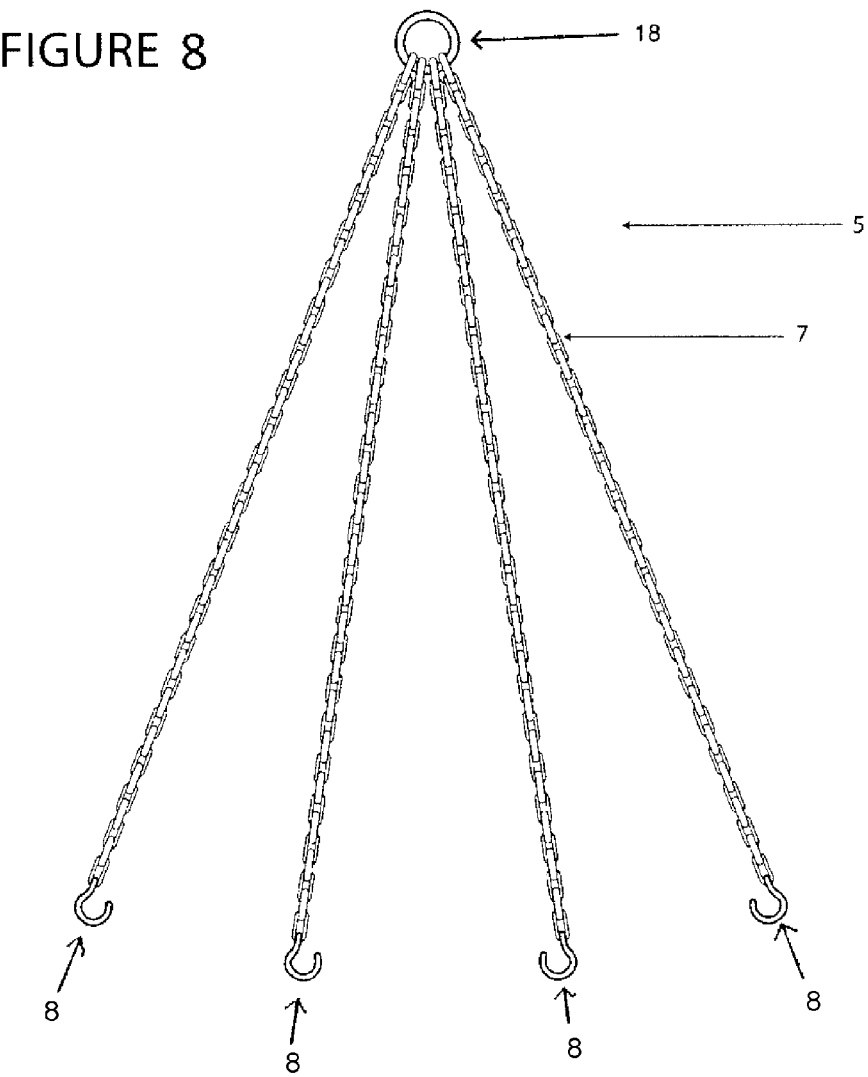
FIG. 8 shows the hanging assembly (5). There are four stringers (7) which end in hooks (8). The stringers attach to a ring (18).

FIG. 8 shows the hanging assembly (5). There are four stringers (7) which end in hooks (8). The stringers attach to a ring (18). The pot portion (9) of the hanging planter is open on both ends. The pot (9) has lips (10) on each end, which allow the end caps (2) and (3) to be attached to the pot (9) via clips

(13) in end caps (2) and (3). The pot portion (9) of the planter may be made from a variety of materials including metals aluminum or steel. If steel is used it should be treated so as to prevent rust. The steel may be plated by hot dip galvanizing or electroplating with more inert metals such as zinc, chromium or nickel. The steel may also be painted or lacquered. Aluminum may be anodized to create colors. The pot may also be made from a variety of plastics including polystyrene, polyethylene, high density polyethylene, nylon, and polypropylene. High density polyethylene is the preferred as a material for the construction of the pot. High density polyethylene is convenient to mold into the desired shape, and has desired flexibility so that it can be snapped together easily, and sufficient strength to support the weight of the soil and the plant. The end caps may likewise be made of metal or plastics. However, the preferred construction material for the end caps is high density polyethylene.

The pot (9) may have a circular cross section or may have a square cross section. The pot (9) could also have a cross section in the shape of a triangle, a square, a pentagon, or a hexagon. A circular cross section is preferred because it is easier to assemble. Any pot having vertices such as a square would require that the end cap have the vertices aligned before assembly.

End cap (2) has a center opening (11). This provides an opening through the plant can grow. The opening is surrounded by tabs (12). The tabs (12) may be between ¾ of an inch to 1½ inch long. There may be between four to eight tabs (12) in the end cap (2). The tabs (12) are somewhat flexible so that commercial transplanters can be used to insert a plant into the planter with end cap (2) in place. However, they are sufficiently rigid to retain the soil in the pot when the planter is turned upside down. The cap has clips (13) which allow the end cap to attach to the pot portion (9) of the planter. There are holes (14) around the circumference of the cap to which the stringers (7) of the hanging assembly (5) can be attached. The importance of attaching the stringers (7) of the hanging assembly (5) to end cap (2) is that when the planter (1) is suspended upside down, the weight of the soil and the plant is born by the hanging assembly (5) rather than by the end cap (2) attachment to pot (9). The hole (14) is reinforced by ribs along each side of the hole. These ribs provide sufficient reinforcement so that the end cap can bear the weight of the plant and the soil at the end of the growing season.

End cap (3) has a recess, that is, a depressed center area (15) with holes (16) through which the plant may be watered. The number and size of the holes may vary. If there are few holes, the individual holes may be larger. If there are a larger number of holes the individual holes may be smaller. The size and number of holes should be relatively small so that when water is place in the reservoir it does not drain into the pot too quickly. It has been found that for a planter having a volume approximate three gallons, six holes between 3/16 and ½ inches in diameter provides good result. Six holes between ¼ and 7/16 in diameter are preferred. Holes of ¼ inch in diameter are most preferred. Smaller or larger holes may be used provided that the relationship between the area of the holes and the volume of the pot is maintained. Similarly larger or smaller pots could be made provided that the relationship between the area of the holes and the volume of the pot is maintained. When the planter is hung upside down the depressed center portion can serve as a reservoir to hold water. This reservoir allows for easier watering and slows the flow of water into the pot.

The hanging planter (1) is assembled by snapping the end caps (2) and (3) onto the pot portion (9) of the planter (1). When the user wishes to use the planter (1), the end cap (2), through which the plant grows, may be removed. Soil may be placed into the planter (1). A small plant may be planted in the center of the soil surface and the end cap (2) may then be reattached. It is also possible to plant a small plant in the pot through the hole in the center of end cap (2). In commercial use, the planter (1) may be filled with soil with end cap (3) attached. A commercial soil filler may be used for this purpose. End cap (2) may then be attached to the pot. A commercial transplanter may be used to put a plant into the pot through the hole in the end cap (2), through which the plant grows. Such machine planting is facilitated by the fact that the tabs (12) are flexible and if they are pushed aside to allow the planting machine to put a plant in the planter (1), they will return to their original shape to retain the soil when the planter is turned upside down. The planter (1) may be used in a conventional manner to allow the plant to grow right side up.

The planter (1) may be shipped with plants already planted. In this case the planter (1) with plants inside may be shipped right side up. The planter (1) may be shipped empty, or the user may desire to use the planter again the next season. In this case the user removes end cap (2) and fills the pot to the top with soil. If the user is using the planter (1) for a second season she need only add new soil to make up for the soil lost when the old plant is removed, or she can replace all of the soil to reduce risk of plant diseases. The new plant may be placed in the center of the top surface of the soil and cap (2) can be attached. The planter may be used for some time as a right side up planter.

When the user desires to use the planter (1) as an upside down planter, the hanging assembly (5) is attached to the end cap (2). Alternatively, the planter may be shipped with the hanging assembly (5) attached to the planter (1). Planter (1) may then be suspended from a convenient support. The attachment of the hanging assembly (5) to the end cap (2) assures that the weight of the soil and the plant will not dislodge the end cap (2) from the planter (1).

The hanging assembly (5) may have three to six stringers (7). Three stringers (7) are sufficient for smaller planters (1). However, larger planters (1) can benefit from having more stringers (7) to reduce the weight each stringer must bear. If the pot (9) has a noncircular cross section, such as a triangle or a square, the number of stringers (7) should match the number of vertices. Thus, a planter (1) having pot (9) with a triangular cross section would have three stringers and a planter (1) having pot (9) with a square cross section would have four stringers.

The end of the stingers (7), which attach to the end cap (2), may use a variety of attachment methods. The end cap (2) has attachment points (14) into which the stringers (7) may be placed. A variety of attachment methods may be used to attach the stringers (7) to the end cap (2). In one embodiment the end cap (2) has holes (14) and hooks (8) at the ends of stinger (7). The hooks (8) at the end of the stringers (7) are put into the holes (14) which are in end cap (2). Other attachment means such as clips, and clamps may be used.

The ends of the stringers (7) may be held on a metal ring (6). If the support is a large hook the metal ring can be placed over the hook. Alternatively the stringers (7) may end in a hook (18) (FIG. 8) which may be suspended from the support. The hook (18) could also be placed over a larger hook. If the stingers end in a hook, the hook may be placed over a rope or wire suspended between two supports. The stingers (7) of hanging assembly (5) may be made metals such as steel or aluminum. They stringers (7) may also be made from flexible plastics such as polyethylene, high density polyethylene, or polypropylene. Steel wire or steel chains are preferred for the stringers (7). The steel wire may be plated or covered with plastic to as to prevent rust. The steel chains may be galvanized.

The planter has recessed portals (17) around the outside pot (9), which can be punched out in manufacturing for production of plants from the sides of the planter. If the portals are punched out, the planter may still be filled with commercial filling equipment, although there would be some spillage of dirt. Spilled dirt can be recovered and reused. One advantage of holes on the side planter is that a large plant, such as a tomato can be planted in the pot and small decorative flowers could be planted in the portals thereby giving the planter a more decorative appearance.

EXAMPLE I

A circular hanging planter suitable for growing plants upside down was made from molded high density polyethylene. The planter was 11 inches in diameter and 10 inches tall and had a volume of 2.90 gallons (10.98 liters). The end cap through which the plant grows was 11 inches in diameter and had a central hole 1 7/32 inches in diameter and tabs cut into the cap 1 inch long. This end cap had four attachment points. The end cap which the plant did not grow through was 10 inches in diameter and had a depressed area 7.75 inches in diameter and 1 3/8 inches deep. The end cap had six holes 7/16 inches in diameter inches in diameter. The hanging assembly had four stringers ending in hooks attached to the end cap through which the plant grows.

EXAMPLE II

A circular hanging planter suitable for growing plants upside down was made from molded high density polyethylene. The planter was 11 inches in diameter and 10 inches tall and had a volume of 2.90 gallons (10.98 liters). The end cap through which the plant grows was 11 inches in diameter, O.D. rim to rim, and had a central hole 1 1/2 inches in diameter and tabs cut into the cap 1 inch long. This end cap had four attachment points. The end cap which the plant did not grow through was 10 inches in diameter and had a depressed area 7.75 inches in diameter and 1 3/8 inches deep. The end cap had six holes 1/4 inches in diameter inches in diameter. The hanging assembly had four stringers ending in hooks attached to the end cap through which the plant grows.

Any numerical range recited herein is intended to include all sub-ranges subsumed therein. For example, a range of "3/16 to 1/2" is intended to include any and all sub-ranges between and including the recited value of 3/16 and the recited value of 1/2.

What is claimed:

1. A planter comprising a pot, a first end cap, a second end cap, and a hanging assembly; said pot comprising an attachment means whereby each end cap may be attached to the pot; said first end cap attached to a bottom end of the pot and comprising a center opening surrounded by inwardly protruding tabs and having holes in an outer rim suitable for attaching said hanging assembly; and said second end cap attached to a top end of the pot and comprising a recess having holes.

2. A planter according to claim 1 comprising a circular cross section.

3. A planter according to claim 2 comprising a hanging assembly comprising three to six stringers.

4. A planter according to claim 2 constructed from high density polyethylene.

5. A planter according to claim 3 constructed from high density polyethylene.

6. A planter according to claim 3 comprising a hanging assembly having four stringers.

7. A planter according to claim 6 constructed from high density polyethylene.

8. A planter according to claim 6 in which the stringers are constructed from steel wire.

9. A planter according to claim 6 having a recess in said second end cap further comprising holes between 3/16 and 1/2 inches in diameter.

10. A planter according to claim 9 constructed from high density polyethylene.

11. A planter according to claim 9 in which said holes are 1/4 inches in diameter.

12. A planter according to claim 9 in which said holes are between 1/4 and 7/16 inches in diameter.

13. A planter according to claim 12 constructed from high density polyethylene.

14. A planter according to claim 1 in which the tabs are 1 inch long.

* * * * *